United States Patent

[11] 3,615,944

[72] Inventors Henry P. Sheng
Narman, Okla.;
F. Thomas Wooten, Raleigh, N.C.

[21] Appl. No. 798,240
[22] Filed Dec. 13, 1968
[23] Division of Ser. No. 529,288, Feb. 23, 1966, Pat. No. 3,473,510
[45] Patented Oct. 26, 1971
[73] Assignee Corning Glass Works
Corning, N.Y.

[54] METHOD FOR THE CONTINUOUS DOPING OF SEMICONDUCTOR MATERIALS
13 Claims, 5 Drawing Figs.

[52] U.S. Cl. .................................................. 148/189,
34/197, 34/15, 34/216, 118/49.5, 148/186

[51] Int. Cl. .................................................. H01l 7/44
[50] Field of Search .................................................. 148/186,
189; 118/49.5; 34/197, 215, 216

[56] References Cited

UNITED STATES PATENTS

| | | | |
|---|---|---|---|
| 3,085,032 | 4/1963 | Fuller | 148/189 |
| 3,279,964 | 10/1966 | Beck | 148/189 |

*Primary Examiner*—L. Dewayne Rutledge
*Assistant Examiner*—R. A. Lester
*Attorney*—Sughrue, Rothwell, Mion, Zinn & Macpeak

ABSTRACT: A method for continuously doping semicondcutor materials whereby the materials are placed in separate chambers which are sequentially exposed to preheating, doping and cooling.

INVENTORS
HENRY P. SHENG
F. THOMAS WOOTEN
BY
Sughrue, Rothwell, Mion, Zinn & Macpeak
ATTORNEYS

METHOD FOR THE CONTINUOUS DOPING OF SEMICONDUCTOR MATERIALS

This is a divisional of application Ser. No. 529,288, filed Feb. 23, 1966, now U.S. Pat. No. 3,473,510.

The present invention relates to a continuous method for doping semiconductor materials and to an apparatus for carrying out the process.

For the most part, the doping of semiconductor materials is currently carried out by "batch" processes. Such processes generally comprise placing a body of semiconductor material in a crucible or other suitable vessel, pushing the vessel into a furnace and introducing a suitable doping agent into the furnace. After doping is completed, the vessel is then withdrawn and the semiconductor material removed.

The batch technique makes it very difficult to obtain a high yield of usable material due to the unreproducibility of the product. For example, the temperature of the boat pushed into the furnace may effect a temperature variation of several degrees and this in turn influences the extent of the doping. Also, the length of exposure of the semiconductor material to the doping atmosphere is difficult to control under such circumstances and numerous human errors intrude.

The primary object of the present invention is to provide a continuous method and apparatus for doping semiconductor materials which enables a high yield of usable doped semiconductor material to be obtained.

The invention generally comprises passing a series of substantially independent chambers through an elongated furnace. Semiconductor material placed in the chambers is sequentially exposed to preheating, doping, and cooling zones in the furnace. Each of the treating stations within the furnace is maintained substantially independent of the others and the temperature profile, drive speed through the furnace, and atmosphere at each treating station are all carefully controlled so as to insure reproducible results.

Figure 1:
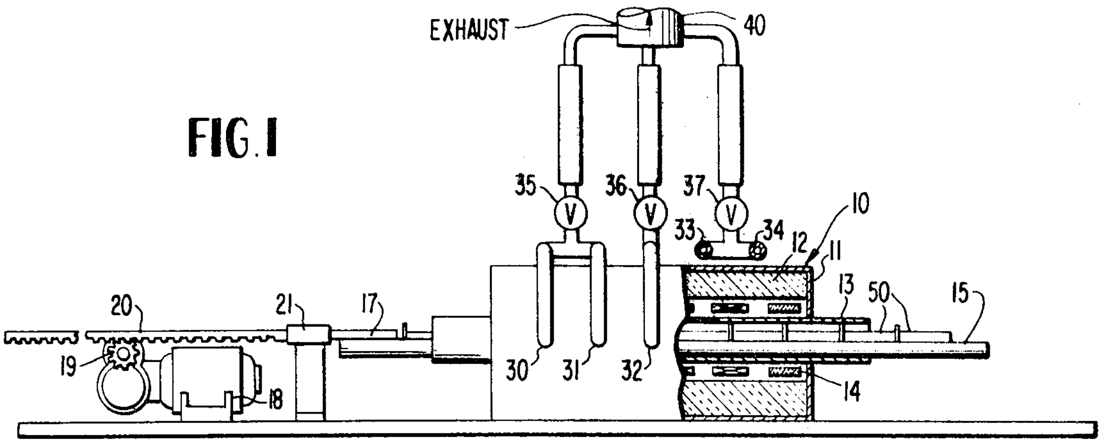
Figure 2:
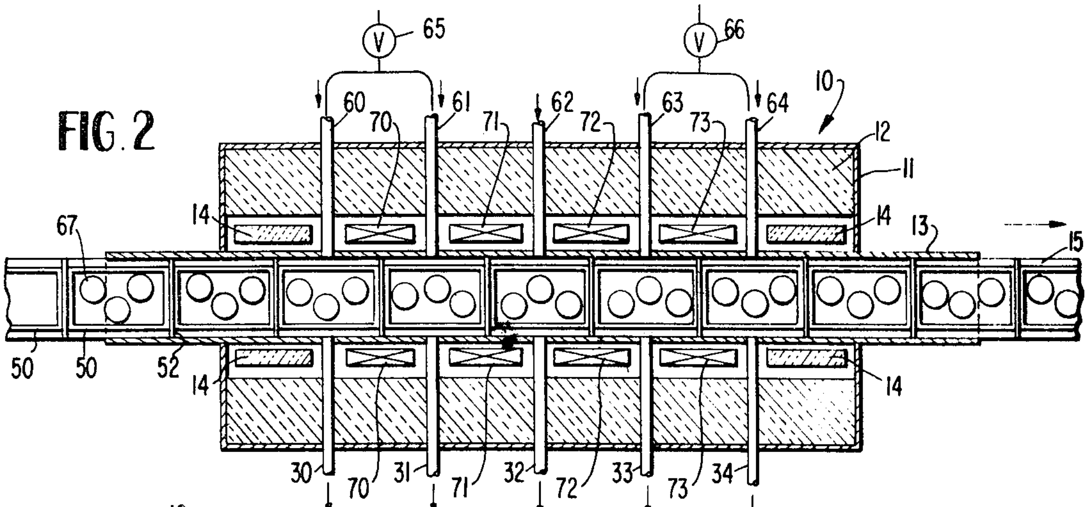
Figure 3:
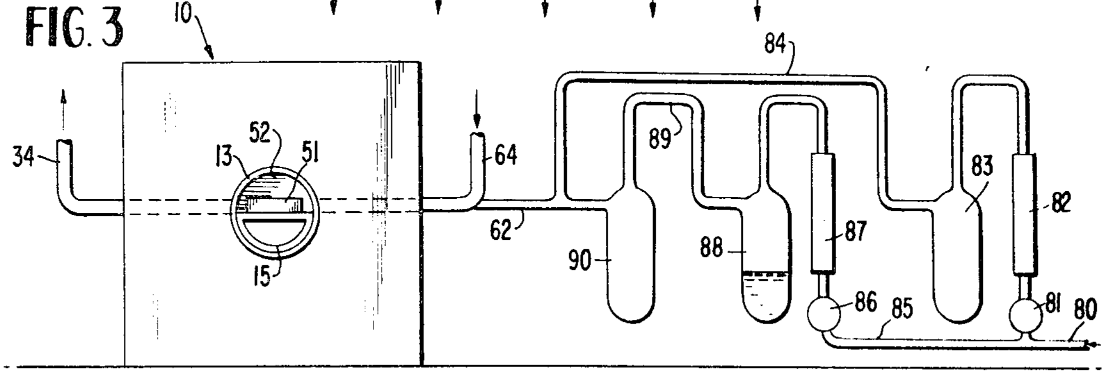
Figures 4, 5:
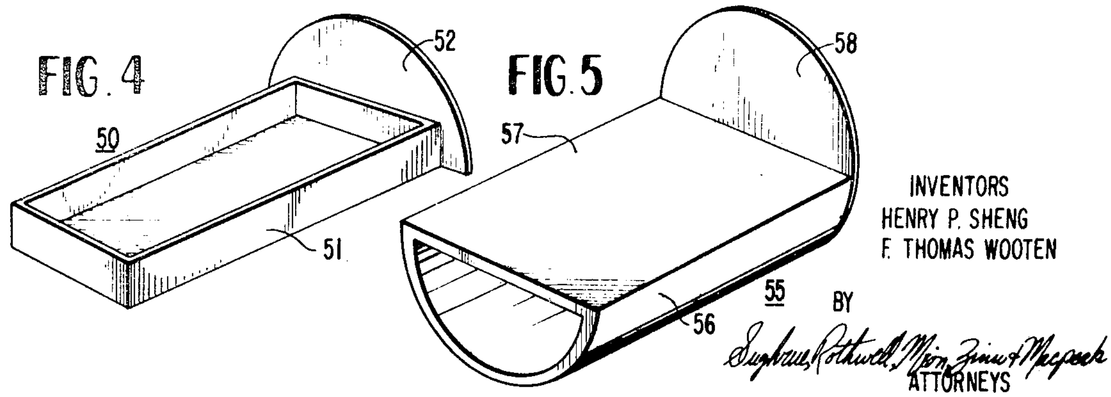

The invention will be more fully appreciated in the light of the following detailed description of a preferred embodiment of the invention and the best method and apparatus which has been contemplated for carrying out the invention. An appreciation of the invention will be further assisted by reference to the accompanying drawing, in which:

FIG. 1 is a side, elevational view, partly in cross section, of an apparatus for carrying out the invention, FIG. 2 is a top, cross sectional view of the furnace shown in FIG. 1 of the drawing, FIG. 3 is an end view of the unload end of the furnace shown in FIG. 1 of the drawing, and a somewhat schematic view of ancillary apparatus for introducing the doping atmosphere to the furnace, FIG. 4 is a detailed perspective view of a preferred embodiment of a vessel for transporting the semiconductor material through the process and apparatus of the invention, and FIG. 5 is a detailed perspective view of another vessel for transporting the semiconductor material through the process and apparatus of the invention.

Referring to the accompanying drawing and in particular to FIG. 1, it will be seen that one embodiment of apparatus in accordance with the present invention comprises a furnace 10 having an internal hollow core along its longitudinal axis. In the portion of the furnace shown in section, it will be seen that the furnace comprises an outer housing 11 lined with a suitable insulating material 12. A sleeve member 13 which may be of generally cylindrical configuration is located in the core of the furnace and extends somewhat beyond each end of the furnace. Mounted in a compartment between sleeve 13, enclosure 11 and insulating material 12 are a series of heating elements 13 by which the internal temperature of the furnace is controlled. These heating elements are preferably independent one from the other so that local control of the internal temperature of the furnace may be exercised.

Insulating members 14 are positioned at each end of the furnace surrounding the sleeve.

Positioned along the length of sleeve 13 and extending beyond each end of the sleeve is a "dee" tube 15. The back of the dee tube is in a horizontal plane and provides a flat floor within sleeve 13.

A series or train of boats or vessels 50 are positioned within the core of the furnace in sleeve 13 and supported by dee tube 15. The train of boats is driven through the furnace by ram 17 which in turn is driven by motor 18 through gear 19 and rack 20. The rack 20 and ram 17 may be supported by standard 21 to align them with the last boat in the train.

While the drive means for advancing the train of boats or vessels through the furnace has been shown as a particular variable speed motor and ram arrangement, it will be understood that any suitable drive means for pushing the boats through the furnace at a desired speed may be utilized.

A series of conduits 30–34 inclusive are shown exiting from the side of the furnace and communicating through valves 35–37 inclusive with exhaust manifold 40. Each conduit 30–34 communicates with a restricted zone or chamber within the furnace.

Referring briefly to FIG. 4 of the drawing, the substantially independent chambers within the furnace are preferably formed by the configuration of the boats themselves. In a preferred embodiment, the boat 50 preferably comprises a tray or support element 51, in which the semiconductor material to be doped is placed. A back plate 52 is attached to the tray element 51 and has a configuration conforming closely to that of the open section of the furnace. Thus, a series of such boats or vessels in end to end relationship form a series of substantially independent chambers within the core of the furnace.

Alternatively, the "dee" tube 15 may be eliminated and boats of the configuration shown in FIG. 5 may be employed. In this case, the tray element 56 of boat 55 is in the form of a "dee" tube. The semiconductor material is supported on the flat, horizontal surface 57 of element 56. Back plate 58 is circular and provides an effective barrier between successive vessels 60 driven through sleeve 13.

Referring now to FIG. 2 of the drawing which is a top sectional view of the furnace portion of the apparatus shown in FIG. 1, it will be seen that semiconductor wafers or discs 60 are placed in the tray portion 51 of boats 50. Each back plate 52 of the boats closely but slidingly engages the upper arch of sleeve 13 and the floor provided by the back of dee tube 15. This establishes a series of chambers or compartments within the furnace, each compartment being approximately the length of an individual boat.

Conduits 30–34 inclusive are shown extending through the side wall of the furnace and communicating with the series of chambers formed within the furnace by the train of boats. As was noted in connection with FIG. 1, this series of conduits is connected through suitable valves with an exhaust manifold 40. On the other side of the furnace, conduits 60–64 inclusive also communicate with the chambers formed within the furnace. These conduits provide means for introducing a desired atmosphere into the which are evacuated through exhaust conduits 30–34 respectively.

Conduits 60, 61, 63 and 64 are preferably supplied through valves 65 and 66 with a suitable inert gas, such as nitrogen, or a mixture of nitrogen with a small amount of oxygen to maintain a substantially nonreactive atmosphere within the respective chambers during the preheating, and cooling stages. A suitable doping atmosphere is introduced through conduit 62 and evacuated through conduit 32.

As illustrated in FIGS. 1 and 2, the train of boats 50 containing semiconductor material to be continuously doped in furnace 10 is driven from left to right, so that the left-hand end of the furnace may be referred to as the feed end and the right-hand side as the unload end. In the preferred embodiment, the first stage of the treatment to which the semiconductor is subjected within the furnace is a preheating step. Heat for this operation may be provided by heating coils 70 and 71 and the atmosphere is controlled by introducing gases through conduits 60 and 61 and evacuating through conduits 30 and 31, respectively. The heating elements are preferably in the form of coils completely surrounding sleeve 13.

Since gaskets or coils of insulating material 14 are positioned at each end of the furnace and since there is a certain amount of heat loss through the ends of the furnace, the temperature profile gradually rises from the ends towards the center. In addition, by providing independent controls for the heating elements, the temperature profile within the furnace may be subjected to further monitoring.

Referring now to FIG. 3 of the drawing, which is an end view of the unload end of furnace 10 and ancillary apparatus for supplying the doping atmosphere to the furnace, it will be seen that each boat 50 is positioned in sleeve 13 so that boat back 52 substantially seals off tray element 51 from following boats. The bottom of tray 51 and boat back 52 rest on and slide along the back of "dee" tube 15 which rests in the lower half of sleeve 13. Inert gas input and output conduits 64 and 34 are shown communicating with the interior of the furnace by dotted lines. Doping atmosphere input conduit 62, partly obscured by conduit 64, is shown with its associated apparatus for generating the desired doping atmosphere.

The ancillary apparatus used for supplying dopant to the furnace is similar to that conventionally used in batch processes and generally comprises a source of oxygen or other carrier gas not shown, which is supplied through conduit 80. The flow of the gas is controlled by valve 81 which communicates with filter 82 and cold trap 83. Together, filter 82 and cold trap 83 combine to dry and purify the carrier gas. The gas is then conducted through conduit 84 to conduit 62 for introduction into the furnace. Part of the input stream of carrier gas from conduit 80 is conducted through conduit 85 and valve 86 and thence through filter 87. The carrier gas from filter 87 is then passed through doping agent source 88 which may contain a body of phosphorous oxychloride ($POCl_3$) or other suitable source of doping agent. The carrier gas containing doping agent is then conducted through conduit 89 and cold trap 90 and is combined in conduit 62 with additional carrier gas prior to introduction into the furnace. Suitable flow meters and valves are inserted in the system shown to control the rate of flow of the carrier gas over the dopant source and to proportion the amount of dopant picked up by the carrier.

In a particular system, the furnace shown may be approximately 36 inches in length with about 6 inches between the input and output conduits, 60–64 and 30–34 respectively. The internal diameter of sleeve 13 may be about 3 inches. The boats 50 may be about 6 inches in length and may be made of alumina with a semicircular alumina disk bonded to a tray section to provide backing 52. Sleeve 13 may have a length of about 44 inches.

In operation, the heating elements 70–73 are actuated to provide a peak internal temperature at the center of the furnace in the range of from 800° to 1300° C. The first of a series of boats 50 are placed on the extension of "dee" tube 15 and additional boats are arranged behind in end-to-end relationship. Additional support means may be necessary outside the furnace to support a particularly long train of boats or the "-dee" tube may simply be extended to provide the necessary support. Suitable drive means are then actuated to drive the train of boats through the furnace at a rate of from about one thirty-second to 22 inches per minute. At the preheat end of the furnace, the temperature is gradually raised to about 800° C., and an inert gas, preferably nitrogen containing 2 or 3 percent of oxygen, is continuously flowed through the chambers at the preheat end of the furnace. In the middle of the furnace, a peak temperature is achieved, preferably around 1000° C., and a gas containing a doping agent is introduced through conduit 62 and withdrawn through conduit 32. Finally, in the cooling end of the furnace, the temperature is reduced gradually back down to about 300° C. before the boats exit from the furnace. Again, nitrogen containing a small amount of oxygen or other inert gas is flowed through conduits 63 and 64 and withdrawn through conduits 33 and 34 to provide the atmosphere in the cooling end of the furnace. In this manner, continuous doping of semiconductors may be carried out with a very high yield of useful product. This is accomplished by forming separate chambers within the furnace by means of the series of semiconductor-containing boats driven through the furnace at a constant speed. The preheating in nitrogen enables the temperature in the doping zone to be closely controlled. Separate chambers are further ensured by creating a slight vacuum in the exhaust lines.

It will be obvious that the apparatus may be readily modified for operation using boats of the configuration shown in FIG. 5.

EXAMPLE

In a preferred embodiment of the invention, semiconductor wafers are placed in a series of boats and advanced through the furnace at a rate of 0.4 inches per minute. The peak temperature at the center or doping station of the furnace is maintained at 860° C. A mixture of dry nitrogen and oxygen in the ratio of 400 cc. per minute of nitrogen to 15 cc. per minute of oxygen is introduced through each of conduits 60, 61, 63 and 64. A doping atmosphere is provided in the center chamber of the furnace by flowing through the center chamber within the furnace a mixture of 425 cc. per minute of oxygen and 40 cc. per minute of oxygen which has been passed over phosphorus oxychloride source material. In this manner, close control of semiconductor doping is readily obtained and reproducible results are achieved.

It will be obvious to those skilled in the art that various modifications may be made in the process and apparatus illustratively described herein without departing from the spirit or scope of the invention as expressed in the following claims.

What is claimed is:

1. A method for continuously doping semiconductor material comprising placing portions of the material in a plurality of vessels, passing said vessels in series through an elongated heating zone containing an initial preheating zone and a doping zone, isolating said vessels one from the other during their passage through said zones, and sequentially preheating and doping the semiconductor material in each of said vessels as it is passed through said preheating zone and said doping zone, respectively, said preheating including passing a substantially nonreactive atmosphere through said vessels.

2. The method of claim 1 wherein said doping is accomplished by passing a carrier gas containing a dopant into said vessels and over said semiconductor material.

3. The method of claim 1 further comprising cooling said semiconductor material after said doping.

4. The method of claim 1 wherein said vessels are passed through said heating zone at a constant speed and the temperature profile through said heating zone is maintained substantially constant.

5. A method for continuously doping semiconductor material comprising:

placing portions of the semiconductor material in a plurality of vessels, passing said vessels in series through an elongated heating zone containing, in sequence, an initial preheating zone and a heated doping zone, maintained at a higher temperature than the preheating zone, isolating said vessels one from the other during their passage through said zones, and, sequentially preheating said semiconductor material while continuously introducing and withdrawing a substantially nonreactive atmosphere into and from said vessels while in said preheating zone, and doping said semiconductor material in said doping zone by continuously introducing and withdrawing a carrier gas containing a vaporized dopant into and from said vessels, so as to contact and dope said semiconductor material.

6. The method of claim 5 further comprising, after said doping, cooling said doped semiconductor material by continuously passing a substantially nonreactive atmosphere over said doped semiconductor material while in said vessels in a cooling zone.

7. The method of claim 5 wherein said substantially nonreactive atmosphere and said carrier gas containing said dopant are continuously introduced into and withdrawn from said vessels by sequentially passing said vessels into temporary fluid communication with the fluid flow path of said substantially nonreactive atmosphere and said carrier gas containing said dopant, said vessels being individually heated in their entirety during said preheating and said doping.

8. The method of claim 7 wherein said vessels are passed through said heating zone at a constant speed and the temperature profile through said heating zone is maintained substantially constant.

9. The method of claim 8 wherein said doping is conducted at a temperature in the range of 800° to 1300° C., which is grater than the preheating temperature.

10. The method of claim 7 wherein said flow path is established by maintaining a vacuum in that portion of the flow path to which said atmosphere and said carrier gas are to be withdrawn.

11. The method of claim 8 wherein said speed is from 1/32 to 22 inches per minute.

12. The method of claim 11 wherein said substantially nonreactive atmosphere is an inert gas.

13. The method of claim 12 wherein said inert gas is nitrogen and said carrier gas is oxygen.

* * * * *